United States Patent [19]

Wicker

[11] Patent Number: 4,547,014
[45] Date of Patent: Oct. 15, 1985

[54] ARTICULATED RIGID COVER ASSEMBLY FOR TRUCK BEDS

[76] Inventor: James A. Wicker, 209 Carbonton Rd., Sanford, N.C. 27330

[21] Appl. No.: 570,979

[22] Filed: Jan. 16, 1984

[51] Int. Cl.$^4$ .............................................. B60P 7/04
[52] U.S. Cl. .................................. 296/100; 160/84 R
[58] Field of Search ............... 296/100, 98, 219, 222, 296/224, 167; 160/84 R

[56] References Cited

U.S. PATENT DOCUMENTS

| | | | |
|---|---|---|---|
| 3,820,840 | 6/1974 | Forsberg | 296/100 |
| 4,084,848 | 4/1978 | Cunningham | 296/224 |
| 4,210,361 | 7/1980 | Marvin et al. | 296/100 |

Primary Examiner—Robert R. Song
Attorney, Agent, or Firm—Charles R. Rhodes; Judith E. Garmon

[57] ABSTRACT

An improved accordion-like folding cover for open truck beds includes a flexible waterproof canvas cover overlying a plurality of elongated metal panels hingedly joined to form a cover assembly. The cover assembly is foldably mounted between a pair of guide tracks which are attached to the upper surface of the side walls of the truck bed; the tracks being attached to the side walls by bolts which are concealed from the exterior of the closed truck bed. An improved locking mechanism comprises a handle and a pair of attached locking arms which extend perpendicularly to and selectively into engagement with the tracking components. By turning the handle, the locking arms are retracted or extended into selected ones of a plurality of slots in the side walls of the tracks for holding the cover in a plurality of positions including fully opened, partially opened, or completely closed. The handle may be locked by a key and the locking arms are concealed beneath the cover assembly for security.

3 Claims, 8 Drawing Figures

ARTICULATED RIGID COVER ASSEMBLY FOR TRUCK BEDS

BACKGROUND AND SUMMARY OF THE PRESENT INVENTION

This invention is related to the body of art that includes covers, and particularly accordion-like folding covers, which are attached to the open bed or body of a pick-up or other truck. The covers convert the open truck to a closed truck for protection of equipment and materials carried therein.

The prior art reveals numerous approaches to sliding or folding truck body covers, many of which are metal and many of which are canvas. U.S. Pat. No. 4,210,361 to Marvin et al discloses a sliding articulated rigid cover assembly for such vehicles that includes an embodiment shown in FIGS. 8–11 in which the accordion-like folding top is slidably mounted between a pair of track members. The articulated cover plates are provided with narrow, individual waterproofing sheets 47 over each of the hinged seams.

One of the major disadvantages to this type of cover and other roll type or spring actuated covers is that they do not provide sufficient security for the contents of the truck bed are easily broken into even when in the locked condition. Additionally, most of them have no provision for securing the cover in a partially open position to protect small tools or other equipment and materials stored at the front end of the truck bed from weather damage or from bouncing out of the truck while it is in movement. Additionally, if for esthetic reasons the owner of the truck desires a canvas or Naugehyde tarp or cover, security problems are increased because the material can be cut or torn away. Combinations of canvas and metal sliding or accordion-like folding covers are rare, and when they have been attempted it has been with some difficulty in joining the canvas to the metal such that the assembly opens and closes smoothly.

It was to overcoming these disadvantages and to substantially improving the security and convenience of such cover assemblies that the present inventor directed his attention.

The present invention is directed to an articulated rigid cover for open truck beds, which rigid cover has a canvas or Naugahyde overlying sheet attached thereto. The cover includes a significantly improved security feature in the way the tracks are attached to the side walls of the truck and also in a unique locking system. The locking system is not only highly improved with regard to security, but it also is designed so that it allows positioning of the cover in a variety of positions along the track so that the truck bed may be partially open, fully open, or closed. The track members which are mounted on top of the side walls of the truck bed are attached in such a way that all of the bolts and attachment elements are concealed from view and accessibility when the cover is completely closed. The tracks further include a plurality of longitudinally spaced slots in the exterior side wall for receiving a pair of oppositely extending locking arms. When the locking arms are engaged in the slots, the cover is held in position. The lock which controls the locking arms further includes a J-hook that engages a metal loop on the tailgate of the truck when the cover is fully extended to prevent opening of the tailgate. The J-hook is vertically adjustable to compensate for various positions of the metal loop.

The overlying canvas sheet is attached to the hinged joints of the articulated rigid cover by means of a washer and rivet combination and as mentioned, provides not only esthetic appeal but also serves to waterproof and protect the hinged accordion cover.

Other and further modifications of the present invention will become apparent to those skilled in the art as the present invention is described in detail below and studied in conjunction with the accompanying drawings in which.

DETAILED DESCRIPTION OF A PREFERRED EMBODIMENT

Figure 1:
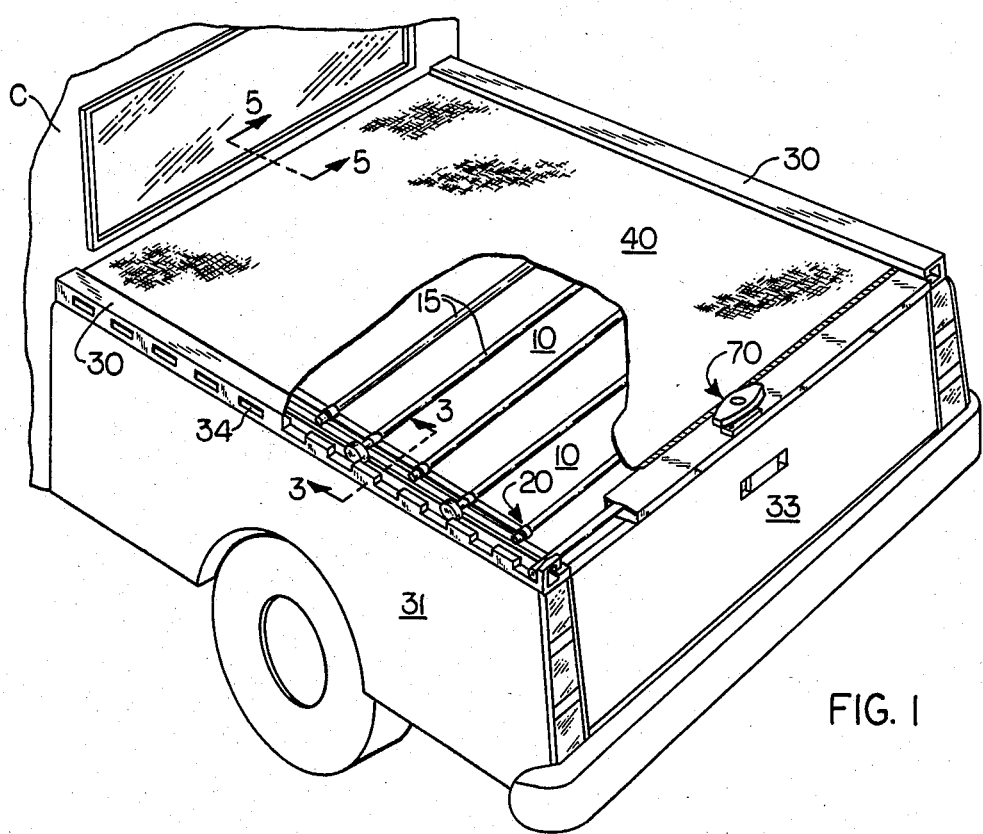
FIG. 1 is a perspective view of the present invention as attached to an open bed truck body.
Figure 2:
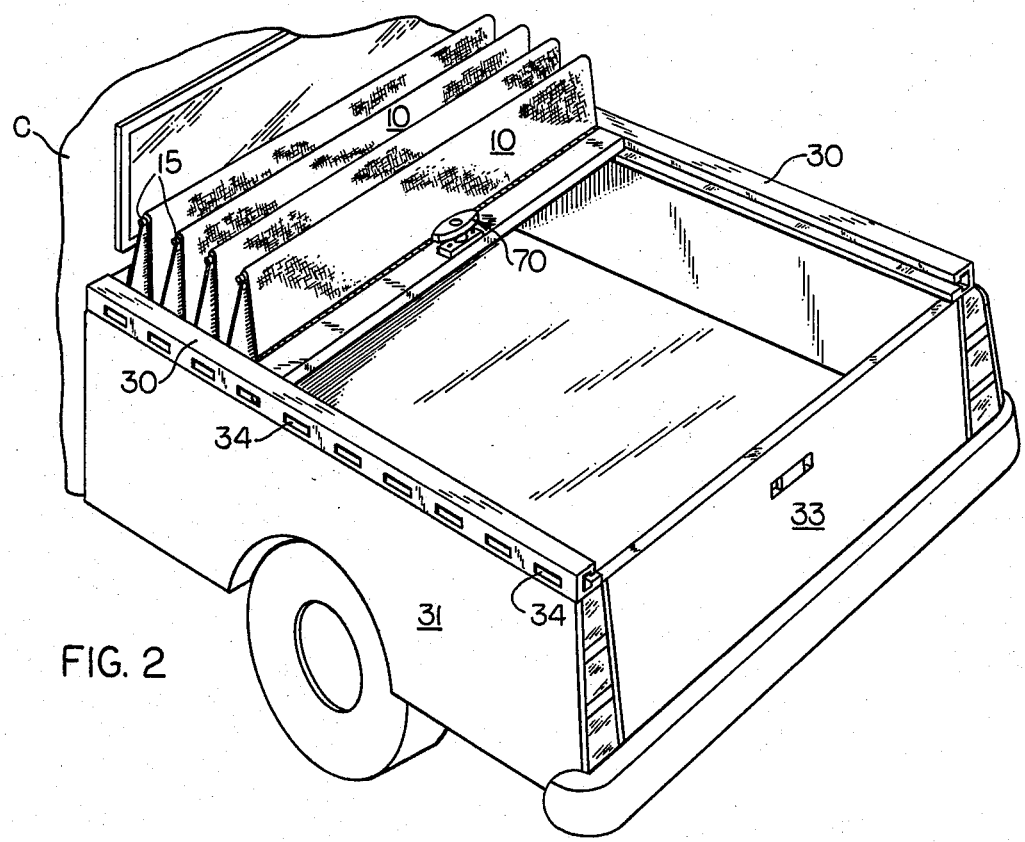
FIG. 2 is a perspective view of the truck cover as shown in FIG. 1 but in a partially opened position.

Looking first at FIGS. 1 and 2 there is shown a standard open bodied pick-up truck having an accordion-like folding cover assembly mounted thereon. In FIG. 1 the cover assembly C is shown in its fully extended or closed position whereby the truck bed is completely closed. FIG. 2 illustrates the assembly in its extreme open position wherein the cover is folded forwardly toward the cab of the truck. The underlying metal cover is comprised of a plurality of rigid, elongated metallic or heavy duty polymeric panels 10 extending across the truck bed. The panels are connected to each other by a hinge means 15 positioned longitudinally between adjacent side edges of the panels 10. Alternate ones of the hinged connections include a wheel or other sliding member 20 on each end thereof. The wheels 20 are movably mounted in a pair of tracks 30 which are attached to the upper surface of the side walls 31 of the truck. The wheels are mounted for rotation in channels 32 of tracks 30 such that the cover is folded or unfolded in accordion-like manner best illustrated by FIG. 2.

The overlying canvas sheet 40 is attached to the underlying articulated cover by means of canvas tabs 41, large washers (not shown) and underlying rivets 43 which are attached to the hinge means 15 as described in more detail below. The overlying cover 40 may be formed of canvas or of a Naugahyde-type material, the only requirement being that it be waterproofed of water-resistant. Such cover provides not only waterproofing for the assembly but also improves security in that it conceals the metallic paneled cover underneath.

Security is further enhanced by the improved locking mechanism 50 utilized for locking the cover to the tailgate 33 or for securing the cover assembly in a plurality of intermediate positions. The locking mechanism 50 is described in greater detail below and illustrated in FIGS. 6 and 7.

Figure 3:
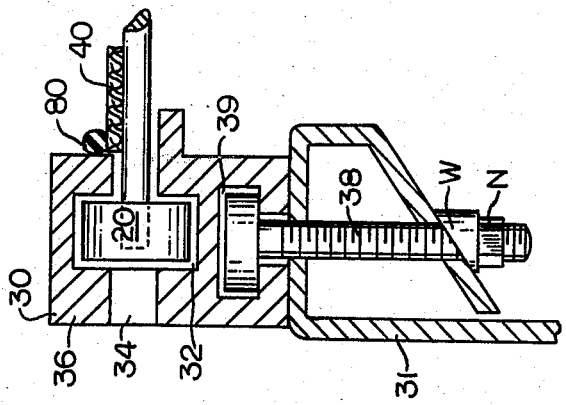
FIG. 3 is a cross-section taken along lines 3—3 of FIG. 1, illustrating a preferred embodiment of the track mechanism.
Figure 4:
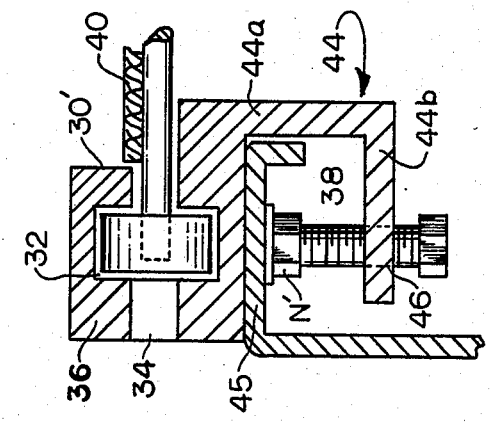
FIG. 4 is a cross-sectional view similar to FIG. 3, but illustrating an alternative embodiment of the track.

FIGS. 3 and 4 illustrate alternate embodiments of the track means 30 in which the cover is movably mounted. The track means 30 and 30' differ only in the manner in which they are attached to the side wall 31 of the truck. FIG. 3 illustrates the track mechanism 30 which is applicable to most styles of truck beds or bodies, and comprises an extruded track 30 having a channel 32 therein for receiving the wheeled sliding member 20 for rolling movement therein. As shown in FIGS. 1 and 2, the extruded track 30 extends the full length of the side walls of the truck bed from the cab of the truck to the tailgate 33. The interior channel 32 extends the full length of the track 30 so that the cover may be extended completely to the closed position or pushed backward against the cab of the truck as shown in FIG. 2. A plurality of slots 34 are cut into the outside wall 36 of the track member. These slots 34 are designed to receive the locking arms shown in FIGS. 6 and 7 as described below. The slots are cut in the wall of the track at approximately three- to four-inch intervals such that the cover may be locked in an open position at a number of points.

One of the tracks 30 is attached to the top surface of each of the truck side walls by means of a plurality of bolts 38, the heads of which are seated in a second channel 39 of the track. Holes are drilled into the upper surface of the side walls 31 of the truck to receive the bolts therein and after the bolts are seated, they are secured by washers W and nuts N.

FIG. 4 shows an alternate embodiment that actually improves the security of the cover assembly, but is not as adaptive to a variety of truck styles as the embodiment shown in FIG. 3. The track 30' is an extruded member similar to that described in FIG. 3, but with a slightly different lower portion. Track 30' includes an L-shaped bracket 44 for attaching the track to the upper surface of the side wall of the truck. The bracket 44 includes a vertical portion 44a and a horizontal portion 44b, which horizontal portion 44b is parallel to and spaced apart from the bottom wall of the track. Some truck side walls include an inwardly and downwardly turned lip or flange 45, and the bracket shown in FIG. 4 fits around that lip. As shown, the bracket 44 cups around the lip of flange 45 such that the track member 30' is seated on the upper surface of the flange 45. The horizontal portion 44b of the bracket includes a plurality of threaded holes 46 therein for receiving bolts 38 which are tightened into nut caps 39'. Such a construction significantly increases the security element of the cover in that the bolts and attachment means are concealed beneath the flange 45 of the side wall, and because of the bracket configuration which is attached around and to the flange, it would be extremely difficult to break the track away from the truck side wall. The slot 34 configuration and the interior channel 32 are the same as described in FIG. 3.

FIGS. 3 and 4 also illustrate the edges of the canvas 40 as closely abutting the inner sidewalls of the tracks. The close abutment tends to direct water from the canvas into the channel 32 and from there, out the open ends of the channels. Such a configuration significantly decreases the amount of water which can get into the truck bed.

FIG. 4 further illustrates an elongated rubber bead 80 which extends along the side edges of canvas 40. The bead 80 directs water toward the middle of the truck bed where it will tend to pool. The bead 80 is optional and used only in areas or environments where encouraging small amounts of water to pool on the canvas 40 would create few, if any problems.

Figure 5:
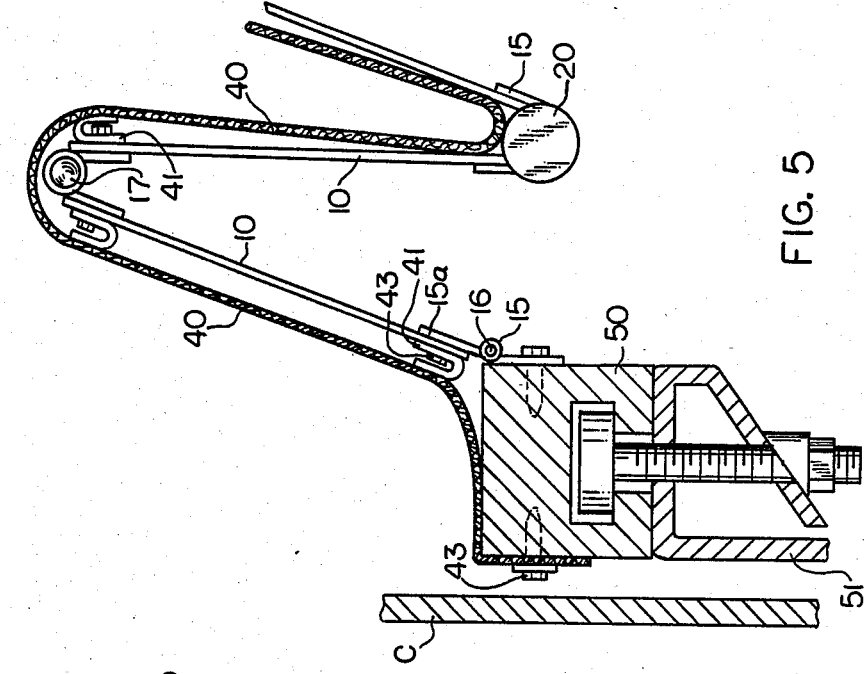
FIG. 5 is a cross-sectional view taken along lines 5—5 of FIG. 2, illustrating the front end portion cover mechanisms when the cover is in a partially folded or open position.

FIG. 5 is a cross-sectional view of the folded cover assembly illustrating the cross bar 50 which is attached to the forward end wall 51 of the truck bed adjacent the back of the cab C, and on which is secured the first hinged attachment 15 of the elongated metal panels 10. The hinge means 15 each include a one-eighth inch dowel pin 16, and on alternate hinges there is a butterfly spring 17 attached thereto. The butterfly spring 17 is attached to the hinge mechanism in for the purpose of biasing the adjacent panels together along the hinge means 16. Those hinged joints not including the butterfly spring 17 are those that have the wheel 20 mounted thereon for movement in the track channel 32.

Also shown in FIG. 5 the canvas cover 40 is attached to the rear surface of the cross bar 50 before it is attached to the wall of the truck. The canvas is attached by a rivet or brad 43 and is then attached to each hinge. To allow for tolerance in the folding and unfolding of the canvas cover over the metal cover, a canvas tab 41 is attached to the underside of the canvas by sewing or other means, and the loose end of the tab is secured to the hinge leaf 15a by a rivet or brad (now shown). For durability the tab may further include a large washer for seating under the rivet so that the attachment means is metal to metal rather than metal to cloth.

Figure 6:
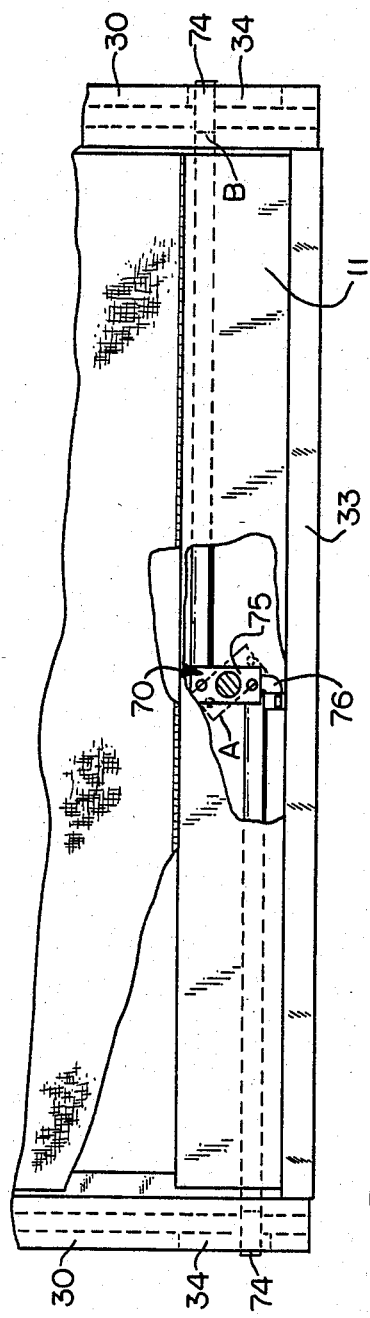
FIG. 6 is a plan view of the locking device.
Figure 8:
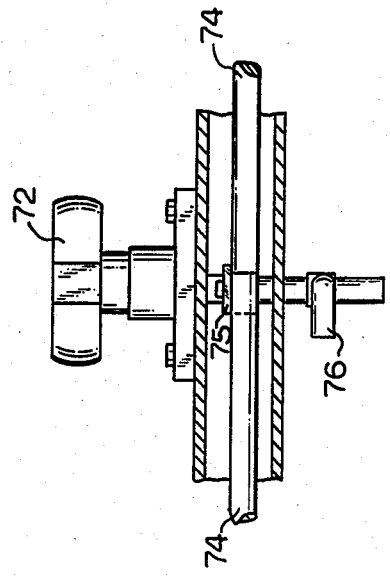
FIG. 8 is a rear view of the locking device with parts broken away.
Figure 7:
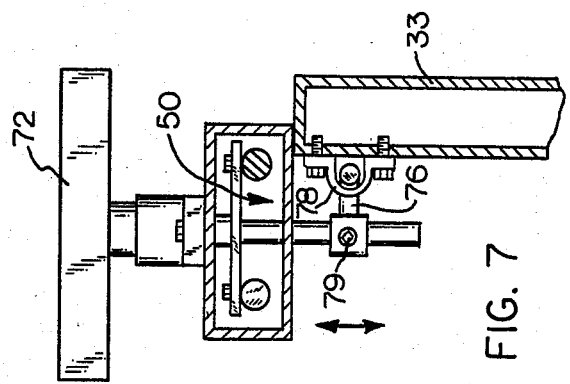
FIG. 7 is a cross-sectional view taken substantially along lines 6—6 of FIG. 5, and illustrating the key cylinder and J-hook of the locking mechanism.

Looking now at FIGS. 6-8, the locking mechanism 70 is shown to generally comprise a locking handle 72 and operatively connected locking arms 74 and a tailgate engaging J-hook 76. Locking handle 72 is a commercially available "T" handle provided with a key and cylinder type lock. The J-hook 76 is received in a metal loop 78 mounted on the inner surface of the tailgate 33. The locking handle 72 may be locked or unlocked by a key for security. The locking arms 74 are attached to a rotating metal plate 75 (secured to the shaft of locking handle 72) such that the locking arms extend perpendicular to the track 30, one in each direction, from the plate 75. The locking arms are of a length approximately one-half the width of the truck bed so that they will extend into a selected slot 34 in the track 30. To operate, the metal plate is secured to the locking handle such that when the handle is turned counterclockwise the metal plate also turns and retracts the locking arms 74 from the slot 34. As the handle is turned counterclockwise the plate 75 rotates to position A to pull the locking arm 74 back to a position illustrated by the dotted line B. When it is desired to lock the cover assembly into a position, the handle is turned in the opposite direction so that the arms move into position in the selected slot. Simultaneously with such movement, the J-hook 76 moves in and out of a position engaging the metal loop 78. The loop 78 is attached to a selected position near the top of the inside wall of the tailgate 33. Because the loop is attached to the inside wall there is an increased security factor in that it is not accessible to breaking or jimmying. To allow for a variety of positions of the metal loop 78, the J-hook is vertically adjustable on the shank 77 of the lock. The J-hook may be moved upwardly or downwardly as desired and held into position by a set screw 79. The locking mechanism is attached to the terminal articulated panel 11 such that when the cover is fully closed, the locking mechanism lies adjacent the tailgate 33.

There has thus been described a highly improved cover assembly for the open body or bed of a truck, the security of which is far more than that achieved with previously known cover assemblies. It is recognized that other modifications might be made to the cover assembly while remaining within the scope of the claims below.

What is claimed is:

1. An accordion-like folding cover assembly for open truck beds which have front and side walls and a hinged tailgate, said cover assembly comprising:
   (a) a pair of track members mounted one on each side of said side walls; said track members including an attachment means for securing said track to the upper surface of said side walls, and said attachment means being concealed from visibility and access from outside said truck bed;
   (b) an articulated rigid cover formed of a plurality of rigid, elongated panels extending across said open truck bed, said panels including a hinge means for hingedly connecting the panels to each other along the sides thereof;
   (c) guide means attached to selected ones of said plurality of panels for engagement with said track members to guide the movement of said panels along said track members between an open and closed position;
   (d) a flexible cover member of continuous sheet material overlying said plurality of rigid panels for rendering said articulated rigid cover substantially water impervious and for improving the esthetic appearance of the overall cover assembly;
   (e) said flexible cover having means for attachment to each of said underlying rigid panels;
   (f) locking means mounted on the rear end of said articulated rigid cover and cooperating with said track members for retaining said cover assembly along said track members in a selected one of a plurality of positions;
   (g) said attachment means including a bracket means depending downwardly from said track, said bracket means being L-shaped and having a vertical portion and a horizontal portion; said vertical portion depending downwardly from the undersurface of said track such that said horizontal portion is underneath and parallel to the undersurface of said track and spaced therefrom;
   whereby as said cover assembly is opened, it may be folded accordion-like toward the truck cab and locked in any one of a plurality of positions intermediate the tailgate and the cab, or in the closed position may be pulled to its fully extended length whereby said truck bed is fully closed and locked.

2. An accordion-like folding cover assembly for open truck beds which have front and side walls and a hinged tailgate, said cover assembly comprising:
   (a) a pair of track members mounted one on each side of said side walls; said track members including an attachment means for securing said track to the upper surface of said side walls, and said attachment means being concealed from visibility and access from outside said truck bed;
   (b) an articulated rigid cover formed of a plurality of rigid, elongated panels extending across said open truck bed, said panels including a hinge means for hingedly connecting the panels to each other along the sides thereof;
   (c) guide means attached to selected ones of said plurality of panels for engagement with said track members to guide the movement of said panels along said track members between an open and closed position;
   (d) a flexible cover member of continuous sheet material overlying said plurality of rigid panels for rendering said articulated rigid cover substantially water impervious and for improving the esthetic appearance of the overall cover assembly;
   (e) said flexible cover having means for attachment to each of said underlying rigid panels;
   (f) a locking means mounted on the rear of said articulated rigid cover and cooperating with said track members for retaining said cover assembly along said track members in a selected one of a plurality of positions; said locking means including;
      (i) a pair of oppositely extending locking arms mounted on the most rearward of said elongated panels adjacent said tailgate when said truck bed is fully covered;
      (ii) means for retractably engaging said arms into said track members and means for retaining said arms in said track members at a plurality of selected positions;
      (iii) means for locking said cover assembly to said tailgate;
   (g) said locking means comprising:
      (i) a metal loop projecting outwardly from the inner surface of said tailgate;
      (ii) a J-hook operatively associated with said locking means for reciprocal movement into and out of said metal loop; whereby when said cover assembly is fully extended to completely close said truck bed, said locking means is activated to move said J-hook into said metal loop.

3. A cover assembly according to claim 2 wherein said locking means further includes means for rendering said J-hook vertically adjustable to align with a variety of positions of said metal loop.

* * * * *